(12) United States Patent  (10) Patent No.: US 7,630,349 B2
Freedman et al.  (45) Date of Patent: Dec. 8, 2009

(54) ANTENNA DIVISION MULTIPLE ACCESS

(75) Inventors: Avraham Freedman, Tel Aviv (IL);
Yoav Atzmon, Modiin (IL)

(73) Assignee: Ramot at Tel-Aviv University Ltd., Tel-Aviv (IL)

( * ) Notice: Subject to any disclaimer, the term of this patent is extended or adjusted under 35 U.S.C. 154(b) by 467 days.

(21) Appl. No.: 11/072,339

(22) Filed: Mar. 7, 2005

(65) Prior Publication Data
US 2005/0195784 A1  Sep. 8, 2005

Related U.S. Application Data

(60) Provisional application No. 60/549,983, filed on Mar. 5, 2004.

(51) Int. Cl.
*H04W 4/00* (2006.01)
*H04B 7/02* (2006.01)
*H04L 27/00* (2006.01)

(52) U.S. Cl. ......................... 370/338; 375/267; 375/299

(58) Field of Classification Search ................ 375/267, 375/299; 370/338
See application file for complete search history.

(56) References Cited

U.S. PATENT DOCUMENTS

| | | | | |
|---|---|---|---|---|
| 6,473,467 B1* | 10/2002 | Wallace et al. | | 375/267 |
| 6,665,311 B2* | 12/2003 | Kondylis et al. | | 370/462 |
| 6,798,769 B1* | 9/2004 | Farmwald | | 370/352 |
| 7,408,909 B2* | 8/2008 | Trainin et al. | | 370/338 |
| 2003/0100343 A1* | 5/2003 | Zourntos et al. | | 455/562 |
| 2003/0198282 A1* | 10/2003 | Tujkovic et al. | | 375/146 |
| 2004/0002364 A1* | 1/2004 | Trikkonen et al. | | 455/562.1 |
| 2004/0208145 A1* | 10/2004 | Sim et al. | | 370/335 |
| 2005/0141459 A1* | 6/2005 | Li et al. | | 370/334 |
| 2005/0152473 A1* | 7/2005 | Maltsev et al. | | 375/299 |

OTHER PUBLICATIONS

V-Blast : An Architecture For Realizing Very High Data Rates Over The Rich-Scattering Wireless Channel, Wolniansky et al ; http://www1.bell-labs.com/project/blast/high-level-overview.html http://www1.bell-labs.com/project/blast/isart-98/P001.html.
B. Vucetic and J. Yuan in *Space-Time Codes* (Wiley, 2003) under the general heading of "layered space-time coding".

(Continued)

*Primary Examiner*—Lester Kincaid
*Assistant Examiner*—Matthew Sams
(74) *Attorney, Agent, or Firm*—Mark M. Friedman

(57) ABSTRACT

Three or more nodes, each with a plurality of antennas, communicate by transmitting messages simultaneously to each other. One of the nodes transmits two messages to two different destination nodes using different sets of its antennas. A receiving node receives at least two of the messages as a received signal, and uses a spatial demultiplexing algorithm such as VBLAST to extract from the received signal at least one message for which the receiving node is a destination node. Before the messages are transmitted, it is decided how many of its antennas each node is allowed to use to transmit each of its messages. For that purpose, the nodes exchange RTSs (Request To Send messages) and CTSs (Clear To Send messages). Collisions among the nodes are resolved. A transmission power and a route are selected for each message.

17 Claims, 4 Drawing Sheets

OTHER PUBLICATIONS

"Carrier Sense Multiple Access with Collision Detection" protocol—J. P. Monks et al., "A power controlled multiple access protocol for wireless packet networks", *IEEE Conference on Computer Communications* (*INFOCOM*) vol. 20 pp. 1-11 (Apr. 2001).

G. Chen and I. Stojmenovic, *Clustering and Routing in Mobile Wireless Networks*, Technical Report TR-99-05, Computer Science, SITE, University of Ottawa (Jun. 2001).

H. Dai and A. F. Molisch, "Multiuser detection for interference—limited MIMO systems", *Proc. IEEE VTC 2000 Spring*, Birmingham AL, USA, May 2002.

Antenna Division Multiple Access—ADMA—For Ad-Hoc MIMO Wireless Networks, Atzmon et al International Workshop On Theoretical And Algorithmic Aspects Of Wireless Ad Hoc, Sensor And P2P Networks. Jun. 2004.

* cited by examiner

ANTENNA DIVISION MULTIPLE ACCESS

This is a continuation-in-part of U.S. Provisional Patent Application No. 60/549,983, filed Mar. 5, 2004

FIELD AND BACKGROUND OF THE INVENTION

The present invention relates to wireless networks and, more particularly, to a method of Multiple-Input-Multiple-Output (MIMO) communication among the nodes of such a network in which a node can use different sets of its antennas for different purposes, such as simultaneous transmission to two other nodes or simultaneous transmission and reception.

An ad hoc wireless network is a group of transceivers set together in an arbitrary formation with no permanent infrastructure. The transceivers form a network by contacting each other based on a predetermined set of protocols and establish the network in a distributed fashion. Conceptually, the network is a graph, with each transceiver being a node of the graph and the communication channels between the transceivers being edges of the graph. Consequently, the terms "transceiver", "terminal" and "node" are used interchangeably herein. The network allows flexibility in the addition and subtraction of members.

In a network communications model analogous to the OSI seven-layer model of computer networking, the first layer of the network is based on its physical layer. This layer determines the frequency bandwidth, the modulation and the coding of the transmissions. The second layer of the model is the Medium Access Control (MAC) protocol. The MAC layer determines the timing and synchronization, and determines which of the users is allowed to access the physical medium and transmit at any given time, frequency and/or code. The MAC layer also prevents collisions that occur when multiple users attempt to use the same physical resource at the same time. The third layer of the model is the network layer. This layer determines the routes of transmission of messages according to predetermined algorithms based on predetermined metrics such as the length of the path, the connectivity, congestion, maximum flow, etc.

Future ad hoc wireless networks will be required to have improved performance compared to current wireless LAN standards such as IEEE 802.11b. Both the spectral efficiency and the channel utilization need to be improved. Recently, a wireless communications technique called VBLAST (P. W. Wolniansky et al., "V-BLAST: an architecture for realizing very high data rates over the rich-scattering wireless channel", *Proceedings URSI International Symposium on Signals, Systems and Electronics* (IEEE, New York N.Y., USA, 1998) pp. 295-300) has been introduced to address the spectral efficiency challenge. VBLAST is a MIMO technique: it uses multi-element antennas at both the transmitter and the receiver to permit transmission rates far in excess of those possible using conventional approaches.

In wireless systems, radio waves do not propagate simply from transmit antennas to receive antennas, but bounce and scatter randomly off objects in the environment. This scattering is known as "multipath" because it results in multiple copies ("images") of the transmitted signal arriving at the receiver via different scattered paths. In conventional wireless systems, multipath represents a significant impediment to accurate transmission, because the images arrive at the receiver at slightly different times and can thus interfere destructively, canceling each other out For this reason, multipath is traditionally viewed as a serious impairment. Using the VBLAST approach, however, it is possible to exploit multipath, that is, to use the scattering characteristics of the propagation environment to enhance, rather than to degrade, transmission accuracy by treating the multiplicity of scattering paths as separate parallel subchannels.

VBLAST accomplishes this by splitting a single user's data stream into multiple substreams and using an array of transmitter antennas to simultaneously launch the parallel substreams. All the substreams are transmitted in the same frequency band, so spectrum is used very efficiently. Because the user's data are being sent in parallel over multiple antennas, the effective transmission rate is increased roughly in proportion to the number of transmitter antennas used.

At the receiver, an array of antennas is again used to pick up the multiple transmitted substreams and their scattered images. Each receive antenna "sees" all of the transmitted substreams superimposed, not separately. But if the multiple scattering is sufficient, then the multiple substreams are all scattered slightly differently, because they originate from different transmit antennas that are located at different points in space. Using sophisticated signal processing, these slight differences in scattering allow the substreams to be identified and recovered. In effect, the unavoidable multipath is exploited to provide a very useful spatial parallelism that is used to greatly improve data transmission rates. Thus, when using VBLAST, the more multipath the better, just the opposite of conventional systems.

The VBLAST signal processing algorithms used at the receiver are the heart of the technique. At the bank of receiving antennas, high-speed signal processors look at the signals from all the receivers simultaneously, first extracting the strongest substream from the morass, then proceeding with the remaining weaker signals, which are easier to recover once the stronger signals have been removed as a source of interference. The ability to separate the substreams depends on the slight differences in the way the different substreams propagate through the environment.

VBLAST is only one of a set of related techniques for exploiting multiple scattering to obtain spatial parallelism. Other such techniques are described by B. Vucetic and J. Yuan in *Space-Time Codes* (Wiley, 2003) under the general heading of "layered space-time coding". Examples of such techniques include, inter alia, the use of LST receivers, with or without parallel interference cancellation. These techniques are referred to herein generally as "spatial demultiplexing" techniques.

Ad hoc transmissions tend to be a mix of messages of various lengths. Examples of long messages include video streaming and VoIP services. Examples of short messages include routing messages, positions of mobile nodes, ACK messages when high reliability service is required, etc. While time division solves some of the bandwidth sharing problem, it is still inefficient to devote an entire time slot to a short message. This inefficiency is further increased when MIMO transceivers are used. For example, in VBLAST, a short message that spans, in its entirety, less than a single time slot, could occupy only a small part of the time required to send a larger message like a single image. Sending an ACK message or a routing message becomes intolerably wasteful, considering the overhead involved with each message transmission.

There is thus a widely recognized need for, and it would be highly advantageous to have, a MIMO wireless communication technique that preserves its inherent efficiency even when transmitting a short message.

SUMMARY OF THE INVENTION

The present invention is based on the observation that spatial demultiplexing such as VBLAST processing works at least as well for superimposed transmissions received from two different transmitters as for superimposed transmissions received from the same transmitter. The fact that transmissions arrive from different sources is expected to enhance the capability of spatial demultiplexing to suppress interference, as the channels are even less correlated than in the single source case. Therefore, according to the present invention, while some of the antennas of a transmitting node are allocated to a specific short transmission, other antennas of the transmitting node are used to transmit or receive other messages to/from other nodes. This concept is illustrated in FIG. 1, which illustrates a system 10 with four nodes 12A, 12B, 12C and 12D. Each node 12 has six antennas 14, performing multiple simultaneous transmissions. Node 12D uses two antennas 14 to transmit a medium-size message to node 12A. At the same time, node 12B transmits with two antennas 14 to node 12A and with one antenna 14 a short burst to node 12C. All four nodes 12 are within transmission range of each other, thus all four nodes 12 receive all four transmissions. Because each node 12 has six antennas 14 to receive with, VBLAST processing decodes all the messages.

Therefore, according to the present invention there is provided a method of communication among at least three nodes, each node including a plurality of antennas, the method including the steps of: (a) each of at least one transmitting node transmitting a first respective message to a destination node of the first respective message, using at least one antenna of the each transmitting node; (b) one of the at least one transmitting node transmitting a second message to a destination node of the second message, using at least one other antenna of the one transmitting node, the destination node of the second message being different from the destination node of the first message; wherein all the transmitting is effected substantially simultaneously; and (c) at one of the nodes: (i) receiving at least two of the messages, substantially simultaneously, as a received signal; and (ii) extracting, from the received signal, at least one of the messages for which the one node is a destination node, the extracting being effected using a spatial demultiplexing algorithm.

Furthermore, according to the present invention there is provided a method of communication among at least three nodes, each node including a plurality of antennas, the method including the steps of: (a) each of at least two transmitting nodes substantially simultaneously transmitting a respective message to a common destination node, using at least one antenna of the each transmitting node; and (b) the common destination node: (i) receiving the messages as a received signal using at least as many of the antennas of the common destination node as a total number of antennas that are used by the at least two transmitting nodes to transmit the messages, and (ii) extracting at least one of the messages from the signal using a spatial demultiplexing algorithm.

The present invention is a method by which at least three nodes, each with a plurality of antennas, communicate with each other. One or more of the nodes transmit(s) (a) respective message(s) to (a) respective destination node(s) of that/those message(s), each transmitting node using one or more of its antennas for that purpose. Meanwhile, one of the transmitting nodes transmits a second message to a respective destination node of the second message that is different from the destination node of the first message transmitted by that transmitting node, using a different one or more of its antennas for that purpose. The messages are transmitted substantially simultaneously. One of the nodes receives two or more of the broadcast messages as a received signal and uses a spatial demultiplexing algorithm, for example a VBLAST algorithm, to extract from the received signal at least one of the messages for which the receiving node is a destination node.

Nodes that seek to transmit messages are termed "source nodes" herein. Preferably, before the source nodes transmit, it is decided, for each source node, how many of its antennas that source node is allowed to use for each one of the messages that that source node seeks to transmit. (If the decision process concludes that a given source node may not use any of its antennas in the current time slot for one or more of the messages that it seeks to transmit, then that source node waits until the next available time slot to transmit that/those message(s).)

The preferred method of deciding how many of its antennas each source node may use to transmit each of its messages has three steps. In the first step, each source node broadcasts, for each message that it seeks to transmit, a respective RTS (a Request to Send message) that includes a desired number of antennas for transmitting the message. In the second step, each node that receives one or more RTSs broadcasts, for each received RTS, a corresponding CTS (a Clear To Send message) that includes an allowed number of antennas. In the third step, each source node adjusts its desired number(s) of antennas in accordance with one or more CTSs that that source node receives. Note that a source node's desired number of antennas could be adjusted down to zero, for example if the source node receives no CTS(s) for its message(s). In that case, the source node waits for the next available time slot.

Most preferably, each RTS includes a training set.

More preferably, the simultaneous transmitting is effected during a common time slot. The process of deciding how many antennas each source node is allowed to use includes allocating a plurality of RTS mini-slots at the start of the time slot and allocating a plurality of CTS mini-slots immediately following the RTS mini-slots. Each source node broadcasts each of its RTSs during one of the RTS mini-slots. Each node that receives one or more RTSs broadcasts each corresponding CTS in one of the CTS mini-slots. Also more preferably, the RTS mini-slots that are used to broadcast the RTSs and the CTS mini-slots that are used to broadcast the CTSs are selected randomly. Most preferably, the number of RTS mini-slots allocated and the number of CTS mini-slots allocated are selected so that the probability of every RTS being received by all the nodes within transmission range of the node that transmits the RTS is at least a predetermined value (e.g., 95% as in the example given below) and so that the probability of every CTS being received by all the nodes within transmission range of the node that transmits the CTS is at least the same predetermined value.

Preferably, the method includes resolving collisions among the nodes. This means that when two nodes seek to transmit to each other, the method decides which node gets to transmit in the current time slot. Preferably, this collision resolution is effected by partitioning the nodes among one or more chains of decreasing desired numbers of transmitting antennas and forbidding the final nodes of the chains to transmit.

Preferably, the method includes selecting a transmission power for each message. Most preferably, the transmission powers are selected in a manner that substantially equalizes minimum signal-to-interference ratios of all the destination nodes. Note that the "interference" in the minimum signal-to-interference ratios that are equalized is interference from all the simultaneous transmissions.

Preferably, the method includes selecting a respective route of each message. Preferably, each message's route is selected to minimize a metric related to interference of nodes other than the node that transmits the message and other than the destination node of the message. (Note that, in general, the preferable routing metric also is based on other factors that are considered in prior art metrics, such as path length, connectivity and stability.) Most preferably, the metric includes a sum of a cost of hard blockages and a cost of soft blockages along the route of the message. A "soft" blockage is a blockage that can be overcome by appropriate processing, for example by spatial demultiplexing. A "hard" blockage is a blockage that can not be so overcome.

From an alternative point of view, the present invention is a method by which at least three nodes, each with a plurality of antennas, communicate with each other. Two or more of the nodes substantially simultaneously transmit respective messages to a common destination node. Each of the transmitting nodes uses at least one of its antennas for that purpose. The common destination node receives the messages as a received signal, using at least as many of its antennas as the total number of antennas that were used by the transmitting nodes to transmit the messages. The common destination node uses a spatial demultiplexing algorithm, for example a VBLAST algorithm, to extract at least one of the messages from the received signal. The preferred implementations of the present invention that are recited above in the context of the first point of view also are applicable to the alternative point of view.

Although the present invention is described herein in terms of simultaneous transmission of messages within discrete time slots, it is to be understood that the scope of the present invention extends to other modes of simultaneous transmission, for example the time persistent approach in which each transmission request is treated separately and is honored as soon as the transmission becomes possible. The modifications of the present invention that are needed in the time persistent approach will be obvious to those skilled in the art. For example, in the time persistent approach, it is not necessary to allocate a plurality of mini-slots for transmitting RTSs and CTSs. The probability of a collision between RTSs and CTSs is sufficiently small in the time persistent approach for only one mini-slot to suffice. The routing method of the present invention is applicable to both the discrete time slot approach and the time persistent approach.

BRIEF DESCRIPTION OF THE DRAWINGS

The invention is herein described, by way of example only, with reference to the accompanying drawings, wherein.

DESCRIPTION OF THE PREFERRED EMBODIMENTS

Figure 1:
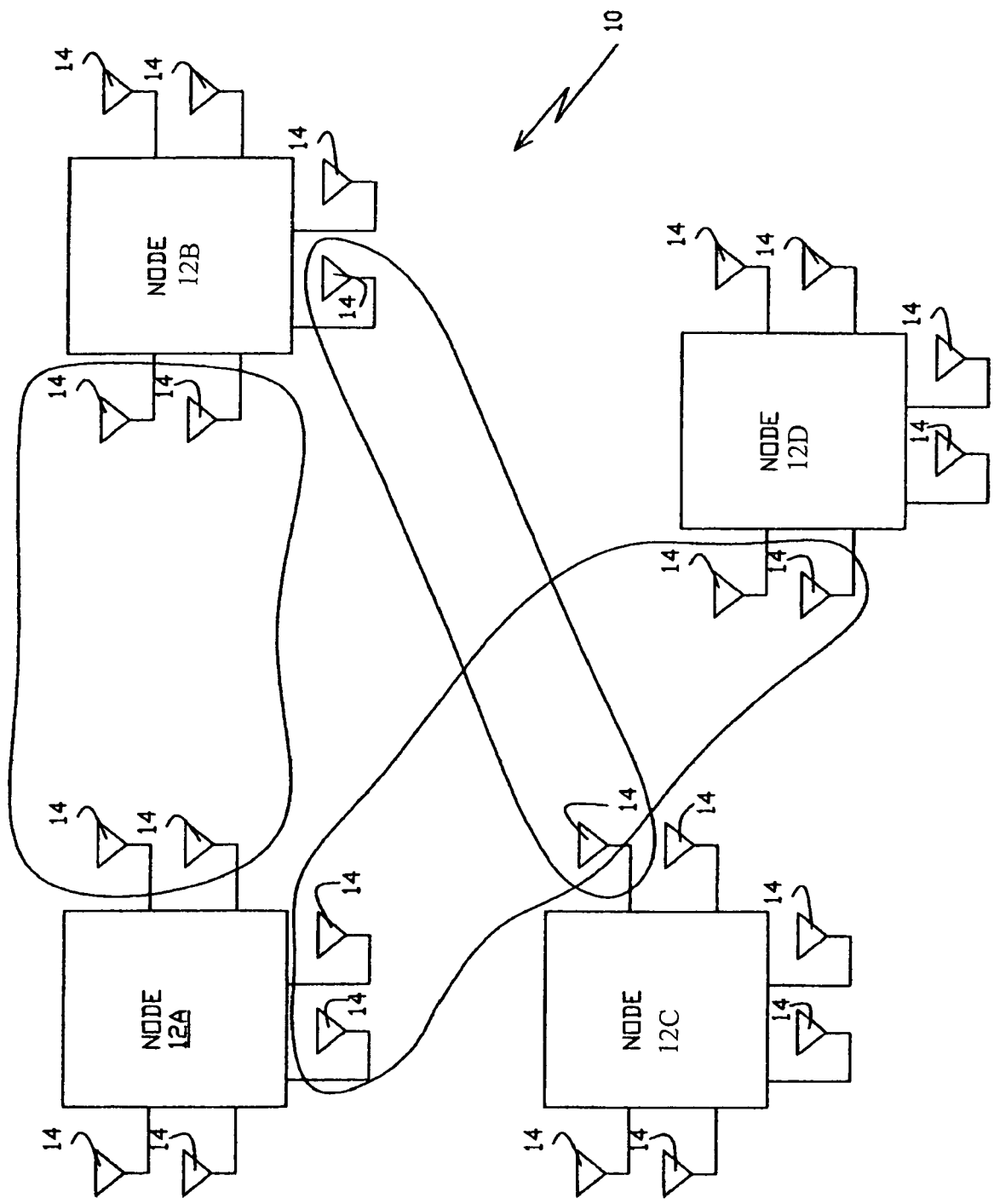
FIG. 1 illustrates a system of the present invention.

The present invention is of a wireless communication method that exploits MIMO to obtain high spectral efficiency even for short messages. Specifically, the present invention can be used to operate an ad hoc wireless network.

The principles and operation of wireless communication according to the present invention may be better understood with reference to the drawings and the accompanying description.

Although the preferred embodiment of the present invention uses VBLAST processing at receiving nodes, the scope of the present invention includes any suitable processing method for extracting superposed messages from a common narrow-bandwidth signal.

To implement the present invention, three challenges must be overcome.

The first challenge is that multiple requests to send should be detected simultaneously, and antenna-sharing decisions should be managed in a distributed fashion. The present invention provides a MAC layer protocol to handle this.

The second challenge is that multiple transmissions within range cause interference with nearby nodes. The present invention provides a power control algorithm to handle this.

The third challenge is to route transmissions in a manner that maximizes the number of simultaneous transmissions. The present invention provides a routing metric to handle this.

MAC Layer Protocol for Antenna Allocation

The MAC layer protocol of the present invention is a time slotted protocol. In each time slot, the algorithm of the protocol decides which node will transmit, how many antennas will be allocated to each node, what power levels will be used, etc.

The distributed antenna allocation method of the present invention uses an exchange of RTSs and CTSs among the nodes. Such messages are exchanged in other protocols, for example in the "Carrier Sense Multiple Access with Collision Detection" protocol (J. P. Monks et al., "A power controlled multiple access protocol for wireless packet networks", *IEEE Conference on Computer Communications (INFOCOM)* vol. 20 pp. 1-11 (April 2001)) that is used in the IEEE 802.11b standard.

Stage 1: Determining the Desired Number of Antennas for Each Node

At the beginning of each slot, any node wishing to send a message (i.e., any source node) transmits a RTS using one of its antennas. Each RTS includes a training set, the ID of the node, the priority of the message to be sent or of the node itself, and the desired number of antennas.

Each node has a total of m antennas.

Each node calculates its desired number of antennas $n_{desired}$ as follows:

First, the percentage of the time slot, Per(i), required to deliver the message with i antennas, is calculated from the size S of the message, the transmission rate R(i), the channel efficiency η and the duration $T_{slot}$ of the time slot:

$$Per(i) = \frac{\left(\frac{S \cdot \eta}{R(i)}\right)}{T_{slot}}$$

For example, if $T_{slot}$ is 6 msec, S is 1024 bits, and assuming 25% channel overhead, with a throughput of 11 Mbps, $$Per(1) = \frac{\left(\frac{1024 * 1.25}{1.1 \times 10^7}\right)}{6} = \frac{0.11}{6} < 1$$

Thus, a single antenna suffices to complete the transmission successfully within the limits of one time slot.

Then a decision rule is applied to choose the minimum number of antennas required from among the sufficient combinations. Per(i) is a monotonically decreasing function of i. If Per(m) exceeds 1, then all m antennas are requested. Otherwise, $n_{desired}$ is set equal to the value of i that gives the largest value of Per(i) that is less than 1. For example, 23 msec, which exceeds the slot length of 6 msec, would be required to transmit a S=200 kbit message using a single antenna. With four antennas, VBLAST allows a rate of 9 bits/sec/Hz, so that $$Per(4) = \frac{\left(\frac{2 \times 10^5 * 1.25}{1.1 \times 10^7 * 9}\right)}{6} = \frac{2.5}{6} = 0.42 < 1$$

To transmit the message within on time slot, the node should request four antennas.

Stage 2: Receiving Nodes Decide on Allowed Number of Antennas

Each receiving node listens to all the RTSs it is capable of detecting. The limit to detection results from more RTSs than the number of antennas, or from a power level lower than the detection sensitivity. Requests from distant terminals are rightly ignored, because their interfering effects are minimal. Requests that are ignored because of an insufficiency of antennas do not receive authorization via CTS and so have no interfering effect.

All other requests, both for this specific node and for other nearby nodes, are accounted for. The total number of requested antennas is:

$$j = \sum_{k=1}^{b} n_{desired}(k)$$

where k indexes the b requesting nodes that are within transmission range.

If $j \leq m$ then all $n_{desired}(k)$ antennas of any node k can be allowed. Otherwise, the excess demand is proportionately subtracted from each request, as follows:

$$n(k)_{allowed} = \left\lfloor n_{desired}(k) + \frac{m-j}{b} \right\rfloor$$

Figure 2:
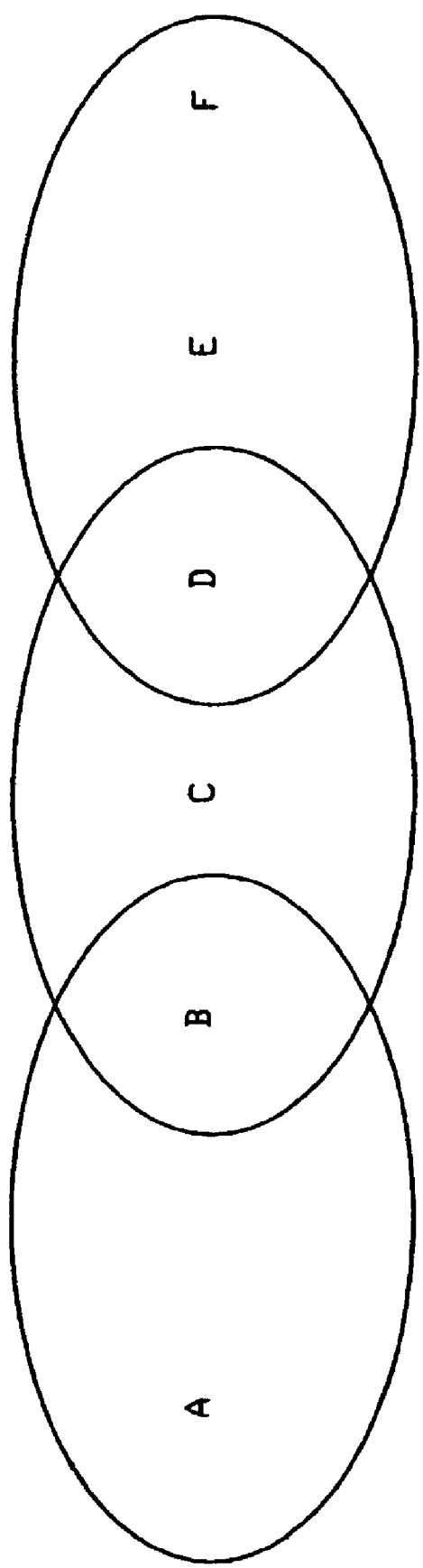
FIG. 2 illustrates the hidden node problem.

Accounting for all the received RTS solves the hidden node problem. This can be appreciated with the help of the example of FIG. 2. Node C requests to send to node D using three antennas, while node E requests to send to node F also using three antennas. Node D has only four antennas, but has to take into account the fact that node F might allow node E to transmit. So node D calculates the rounded down allowed number for node C as follows:

$$n(C)_{allowed} = \left\lfloor 3 + \frac{4-6}{2} \right\rfloor = 2$$

If node F allows node E to use all three requested antennas, there might be a problem. This problem is resolved in the next stage.

Another constraint on the required number of antennas is the channel quality between the transmitter and the receiver. We assume that the channel is known only to the receiver but not to the transmitter. The receiver compensates for channel quality by allowing the transmitter to use fewer antennas. The final decision rule is:

$$n(k)_{allowed} = \min\left(\left\lfloor n_{desired}(k) + \frac{m-j}{b} \right\rfloor, \text{Channel\_Limit}\right)$$

Stage 3: Requesting Nodes Decide on Actual Number of Antennas to Use

Each source node receives CTSs from nearby nodes. It receives $n_{allowed}$ from its own destination node, but also learns about the values of $n_{allowed}$ calculated for it by the other receiving nodes. If all the received values of $n_{allowed}$ are less than m, then the node may use the value of $n_{allowed}$ received from the destination node as the number of transmitting antennas. Otherwise the node must deduct and round down using the following decision rule:

$$n(k)_{used} = \min\left(n(k)_{allowed}, \left\lfloor n(k)_{allowed} + \frac{m-l}{h} \right\rfloor\right)$$

where h is the number of nodes in the vicinity that have been allowed to transmit and l is $$l = \sum_{k=1}^{m} n(k)_{allowed}$$

Rounding down twice ensures that the algorithm is stable and that no excess transmissions are performed. This gives the present invention a high detection probability rate.

Each transmitting node for which $n_{used} > 0$ uses $n_{used}$ antennas to transmit. The transmission starts with a declaration of the number of antennas used, to help the receivers with signal detection and noise filtering.

It is assumed above that each source node wants to transmit only one message. If a source node wants to transmit more than one message, it issues a separate RTS for each message, subject to the constraint that the sum over all its $n_{desired}$'s may not exceed m.

Collision Resolution

In a highly loaded network, collisions may occur: a source node that needs all its antennas to transmit may be the destination node of another source node and so may be unable to receive the transmission from that other source node. It is necessary to select which of the two source nodes is allowed to transmit.

That the RTSs advertise the source nodes' requested number of antennas allows resolution of collisions. A highly loaded source node may ask to use all m of its antennas, while other source nodes settle for only one or two antennas. Under VBLAST, it is more efficient, and also helpful in stabilizing the network, to give priority to the source nodes that request the most antennas. Stability is achieved because a node that is denied permission accumulates its desired transmissions and is likely to ask for more antennas in the next time slot.

Figure 3:
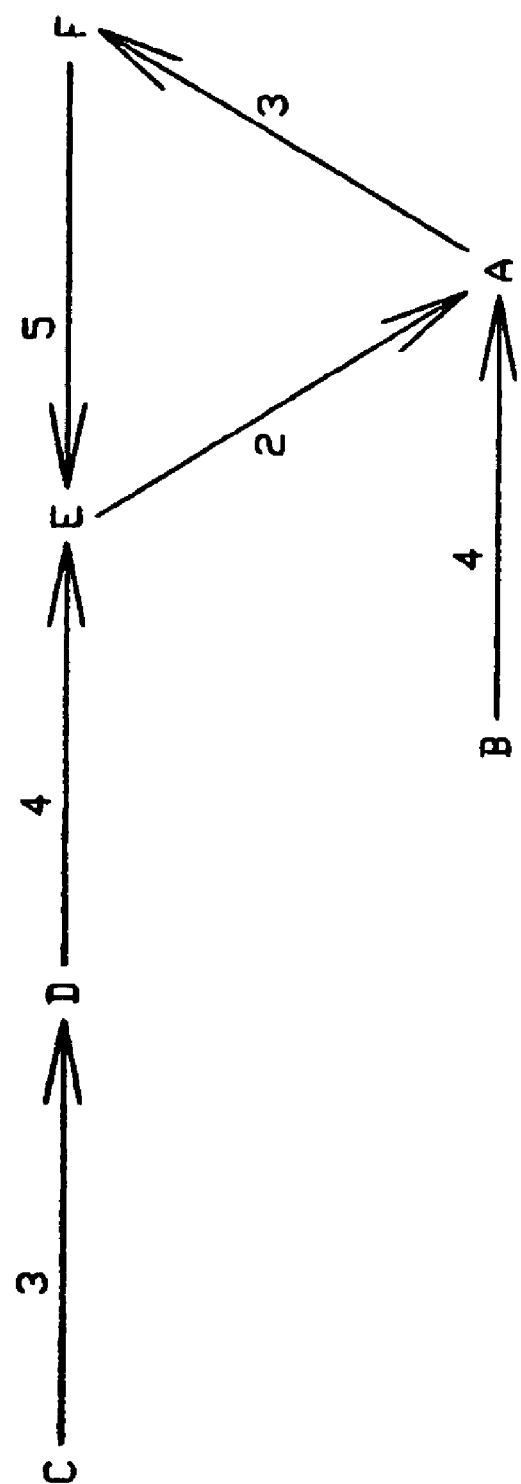
FIG. 3 illustrates how chains of requests are used to resolve collisions.

A "chain of requests" is defined herein as a set of nodes that want to transmit to each other unidirectionally. The number of consecutive decreasing requests determines the length of the chain. The chain is truncated when, absent truncation, the next node in line would ask for as many or more antennas than its predecessor. For example, in FIG. 3:

Node A wants to use three antennas to transmit to node F
Node B wants to use four antennas to transmit to node A
Node C wants to use three antennas to transmit to node D
Node D wants to use four antennas to transmit to node E.
Node E wants to use two antennas to transmit to node A
Node F wants to use five antennas to transmit to node E.

Nodes B and A form a chain of requests. The chain is truncated at node A because node F wants to use more antennas than node A. Similarly, node C is a single-node "chain". The last node in a chain is denied permission to transmit. In the present example, only nodes B, F and D are allowed to transmit. Furthermore, the requested numbers of antennas may be reduced by the above protocol. If m=6, the above protocol allows node D only two transmitting antennas and allows node F only three transmitting antennas.

If two nodes that otherwise would be members of the same chain both request the same number of antennas, then which of the two receives permission to transmit is determined arbitrarily, for example according to which of the two nodes has the lower node ID. In the "overflow" case of every node requesting m antennas, the recent history of antenna use is consulted, and nodes that have recently transmitted, or that have recently transmitted with the most antennas, are denied permission to transmit in the current time slot. Two nodes that seek to transmit to each other resolve their private collision similarly.

Detection of Multiple RTSs and Multiple CTSs

RTSs and CTSs are sufficiently short to be transmitted using a single antenna. Nevertheless, to use VBLAST to detect simultaneously transmitted RTSs (or CTSs), two issues must be resolved.

The first issue is that of knowing the channel. VBLAST requires a receiving node to know the channel between each transmitting antenna and each of the node's receiving antennas. Without such knowledge, detection with multiple antennas is not feasible.

The second issue is that the number of RTSs may exceed the number of antennas (the channel rank), resulting in a complete loss of communication.

The first issue is resolved using training sets. In prior art VBLAST, at the beginning of every transmission a training set is used to acquire the channel. This training set occupies about 20% of the time slot. The present invention does the same for RTSs; but because the rest of a RTS is very short, consisting of just the node ID, the desired number of antennas the message or node priority and, optionally, values of the powers received from other nodes (see below under "Routing Metric"), the relative size of the training set may be considerably larger.

The second issue is resolved by commencing each time slot with mini-slots for RTS and CTS transmission. For example, a 6 millisecond time slot may commence with several RTS mini-slots, each 10 to 50 microseconds long, followed immediately by several CTS mini-slots, each 10 to 50 microseconds long. Which min-slot is used by any given node is selected randomly.

Assume that N nodes, with m antennas each, are within transmission range and are competing for c RTS mini-slots. In the worst case, all N nodes attempt to transmit in the same mini-slot; but the probability of a node transmitting in any given mini-slot is 1/c. So the probability of k nodes transmitting in any given mini-slot is $$h(N, c, k) = \frac{N!}{k!(N-k)!}(1/c)^k(1-1/c)^{N-k}$$

The cumulative probability that the number of transmitted RTS is smaller than or equal to the available number m of antennas is $$H(N, c, m) = \sum_{k=0}^{m} h(N, c, k)$$

Under the best circumstances, m RTSs would be transmitted in each mini-slot, so that d=N/m mini-slots would be required. Because this is unlikely, the actual number of RTS mini-slots provided should be higher than this, by a factor of α, so that c=αN/m. Actually, c should be greater than this, because with all m antennas being used for reception, each node does not receive during the mini-slot that it transmits its RTS. So c=α(1+N/m), and $$H(N, \alpha, d, m) = \sum_{k=0}^{m} \frac{(d-m)!}{k!(d-m-k)!}\left(\frac{1}{\alpha(d+1)}\right)^K\left(1-\frac{1}{\alpha(d+1)}\right)^{d-m-k}$$

Figure 4:
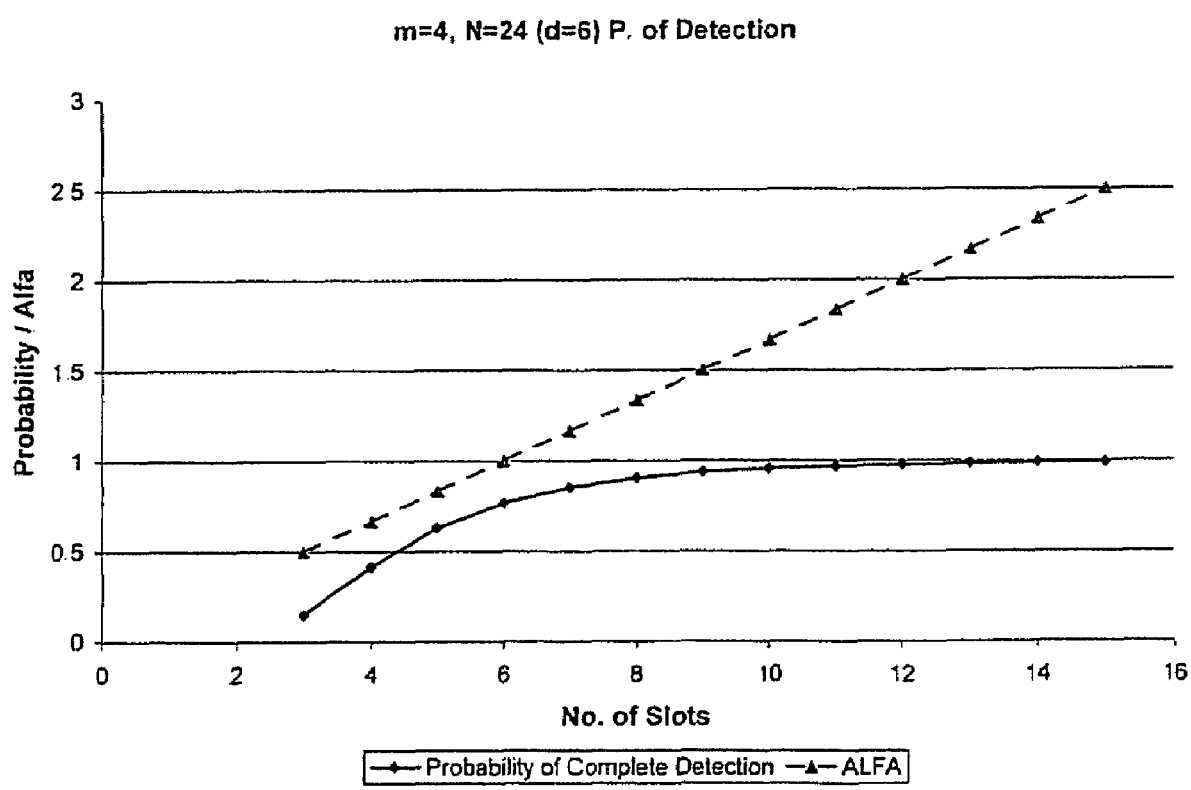
FIG. 4 is a plot of cumulative probability H that all RTSs are detected, and of the corresponding factor α for increasing the number of RTS min-slots used, as functions of the base number d of RTS mini-slots.

For given values of N and m, this equation is solved numerically to determine the detection probability H provided by using ad mini-slots. FIG. 4 shows H and α vs. d for the case N=24, m=4, a relatively large value of N for a controlled power scenario. Assuming all 24 nodes broadcast RTSs, the probability of detecting all 24 RTSs is 95% when d=10 and 99% when d=15. The extra 4% probability does not justify the additional overhead of adding 50% more mini-slots, so in this case preferably d=10 and H=95%.

The number of CTS mini-slots is determined similarly, except that one fewer mini-slot is needed because there is no need to account for self-transmission. Therefore, for CTS, $$H(N, \alpha, d, m) = \sum_{k=0}^{m} \frac{(d-m)!}{k!(d-m-k)!}\left(\frac{1}{\alpha d}\right)^K\left(1-\frac{1}{\alpha d}\right)^{d-m-k}$$

Power Control Algorithm

The measure of signal quality that is used in the present invention for controlling transmission power is the Signal to Interference Ratio (SIR). For a receiving node X that receives powers $\{P_{i,X}\}$ from transmitting nodes indexed by the index i, the SIR of the signal from transmitting node j is:

$$SIR_{j,X} = \frac{P_{j,X}}{\sigma^2 + \frac{1}{L}\sum_{i \neq j} P_{i,X}}$$

where σ is the thermal noise level and L is the VBLAST processing gain. In VBLAST, the processing gain L is itself a function of the received powers and is maximized when all the received powers are equal. In general, it is not possible to equalize all the received power of all the receiving nodes. But it is known that the VBLAST processing gain is dominantly affected by the lowest received powers, because the error rate for those transmissions are highest and are propagated to all stages of VBLAST's iterative signal cancellation algorithm. Therefore, the strategy of the power control algorithm of the present invention is to find the lowest SIR of any receiving node and to increase it without damaging the lowest SIR of any other receiving node.

The following algorithm is an iterative algorithm for adjusting the powers of N≦m transmitting nodes that transmit to a set of receiving nodes. The transmission powers initially are at their maximum values.

For each transmitting node i, the lowest SIR of any of the receiving nodes is denoted "$SIR_i(min)$". The lowest $SIR_i(min)$ is denoted "MIN_SIR(min)". The highest $SIR_i(min)$ is denoted "MAX_SIR(min)". In each iteration, the algorithm finds the ratio C by which to reduce the power transmitted by the transmitting node responsible for MAX_SIR(min) by solving the following equation that seeks to equalize MAX_SIR(min) and MIN_SIR(min):

$$\frac{C \cdot P_{max}(A)}{(\sigma^2 + \sum P_o(A)) + P_{min}(A)} = \frac{P_{min}(B)}{(\sigma^2 + \sum P_o(B)) + P_{max}(B)}$$

where the receiving node of MAX_SIR(min) is denoted "A", the receiving node of MIN_SIR(min) is denoted "B" (note that A and B may be the same node), $P_{max}(A)$ is the power received at receiving node A from the transmitting node responsible for MAX_SIR(min), $P_{min}(A)$ is the power received at node A from the transmitting node responsible for MIN_SIR(min), $P_{max}(B)$ is the power received at receiving node B from the transmitting node responsible for MAX_SIR(min), $P_{min}(B)$ is the power received at receiving node B from the transmitting node responsible for MIN_SIR(min), and $\Sigma P_o(X)$, for X=A or B, is the sum of all the other received powers at node X. The solution of this equation is $$C = -\frac{\sigma^2 + \sum P_o(B)}{2P_{max}(B)} + \sqrt{\frac{(\sigma^2 + \sum P_o(B))^2}{4P^2_{max}(B)} + \frac{P_{min}(B)(\sigma^2 + \sum P_o(A))}{P_{max}(A)P_{max}(B)} + \frac{P_{min}(A)P_{min}(B)}{P_{max}(A)P_{max}(B)}}$$

For example, suppose that nodes 1, 2 and 3 transmit to nodes A, B and C, initially at powers of 10 W, and that the received powers, in Watts, are as in the following table:

|  | Node C | Node B | Node A |
|---|---|---|---|
| Node 1 | 3 | 1.7 | 1.25 |
| Node 2 | 2 | 4 | 1.1 |
| Node 3 | 2.2 | 4 | 3 |

The received SIRs are as in the following table:

|  | Node C | Node B | Node A |
|---|---|---|---|
| Node 1 | 0.714286 | 0.2125 | 0.304878 |
| Node 2 | 0.384615 | 0.701754 | 0.258824 |
| Node 3 | 0.44 | 0.701754 | 1.276596 |

MAX_SIR(min) is 0.38 and is caused by transmitting node 2. MIN_SIR(min) is 0.21 and is caused by transmitting node 1. To equalize these SIRs, the above expression for C gives C=0.664. Applying this value of C to node 2 results in the following SIRs:

|  | Node C | Node B | Node A |
|---|---|---|---|
| Node 1 | 0.850319 | 0.255402 | 0.304878 |
| Node 2 | 0.255402 | 0.465996 | 0.258824 |
| Node 3 | 0.508307 | 0.918236 | 1.276596 |

Because all the minimum SIRs closely match, the algorithm is halted.

Routing Metric

To maximize the number of simultaneous transmissions, the effect of each transmission on the performance of the other nodes must be considered. A node that desires to transmit to another node could do so directly (if the destination node is within transmission range) or indirectly via other nodes. Each path from the transmitting node to the destination node has a cost associated with it, in terms of interfering with transmissions by other nodes. The present invention provides a metric for measuring this cost. The paths used should be chosen to minimize the overall cost for the network of nodes.

Two kinds of interferences must be considered, with reference to the following two parameters:

$\delta_1$ is the minimum gain above thermal noise that is needed for the physical layer to detect a signal.

$\delta_2$ is the processing gain, in dB, provided by the VBLAST processing, for the chosen transmission rate and bit error rate.

Consider, then, a node i that transmits to a node i+1, possibly interfering with a third node q. Let the power received by node i+1 from node i be $P_{r(i+1)}$. Let the power received by node q from node i be $P_{r(q)}$. Three interference situations are possible:

1. No interference when $$\frac{P_{r(q)}}{P_{r(i+1)}} \leq \frac{1}{\delta_1}$$

2. Complete interference when $$\frac{P_{r(q)}}{P_{r(i+1)}} \geq \delta_2$$

3. Partial interference that can be compensated by VBLAST processing, at the cost of reducing the resources available to node q to receive transmissions directed towards it, when $$\delta_2 \leq \frac{P_{r(q)}}{P_{r(i+1)}} \leq \frac{1}{\delta_1}$$

Complete interference is called a "hard blockage" herein. Interference that can be compensated by VBLAST processing is called a "soft blockage" herein.

The routing metric algorithm of the present invention starts by partitioning the network into clusters, using known clustering methods. See for example G. Chen and I. Stojmenovic, *Clustering and Routing in Mobile Wireless Networks*, Technical Report TR-99-05, Computer Science, SITE, University of Ottawa (June 2001). The metric is computed separately for each cluster.

A node that desires to transmit needs to know whether to attempt a direct transmission to the destination node or an indirect transmission (and via which intermediate node). Therefore, each node of the cluster gathers received powers for all the nodes of the cluster. Received powers from other nodes that are within range are measured directly. Received powers at the remaining nodes are updated via transmissions (RTSs and CTSs for active nodes; otherwise, update transmissions every few time slots). This gives the node a matrix of received powers:

$$\begin{bmatrix} 0 & P_{1,2} & P_{1,3} & \cdots & P_{1,N} \\ P_{2,1} & 0 & & & \\ P_{3,1} & & \ddots & & \\ \vdots & & & & \\ P_{N,1} & & & & 0 \end{bmatrix}$$

where N is the number of nodes in the cluster. The diagonal elements of the matrix are all zero because a node does not transmit to itself. Every value $P_{i,j}$ is a moving average of the last several transmissions, to overcome fading effects. Because fading occurs randomly, transmissions from i to j and vice versa are received at slightly different powers. Therefore, the powers are averaged: $\overline{P}_{i,j} = \overline{P}_{j,i} = (P_{i,j} + P_{j,i})/2$.

At this stage the following data are collected by the nodes:

n=the number of nodes within range $\overline{n}$=the average number of actual transmissions within range $\overline{m}$=the average number of transmitting antennas used by the nodes within range Based on the matrix of averaged received powers, soft blocks $b_v$ and hard blocks $b_c$ are calculated for each viable connection (existing link) from node i to node j as follows:

For $J = 1$ through $n$, $J \neq j$:

If $\frac{\overline{P}_{i,j}}{P_{i,j}} \geq \delta_2$ then $b_c = 1$, else $b_c = 0$ If $\delta_2 \leq \frac{\overline{P}_{i,j}}{P_{i,j}} \leq \frac{1}{\delta_1}$ then $b_v = 1$, else $b_v = 0$ All computations to this point are performed before transmission is requested, and are updated every several time slots, according to the relative movement rate of the nodes.

When a specific transmission request is received by a source node S from the application layer, the destination T and the required number of antennas m are known and the separate interference metrics $B_c$ for hard blockages and $B_v$ for soft blockages are computed as follows for each possible path from S to T:

$$B_c = \overline{n}\left(\frac{\sum_{i=S}^{T} b_c}{n}\right)$$

$$B_v = (\overline{n}-1)\left(\frac{\overline{m}}{m}\frac{\sum_{i=S}^{T} b_v}{n}\right) + \left(\frac{m_s}{m}\frac{\sum_{i=S}^{T} b_v}{n}\right)$$

Here, $m_s$ is the number of antennas used by node S to transmit. To find the actual path to use from S to T, a shortest path algorithm (H. Dai and A. F. Molisch, "Multiuser detection for interference-limited MIMO systems", *Proc. IEEE VTC 2000 Spring*, Birmingham Ala., USA, May 2002), to find the path with the minimum total blockage $B_c + B_v$.

While the invention has been described with respect to a limited number of embodiments, it will be appreciated that many variations, modifications and other applications of the invention may be made.

What is claimed is:

1. A method of communication among at least three nodes, each node including a plurality of antennas, the method comprising the steps of:
   (a) each of at least one transmitting node transmitting a first respective message to a destination node of said first respective message, using at least one antenna of said each transmitting node;
   (b) one of said at least one transmitting node transmitting a second message to a destination node of said second message, using at least one other antenna of said one transmitting node, said destination node of said second message being different from said destination node of said first message;
   wherein all said transmitting is effected simultaneously;
   (c) at one of said nodes:
      (i) receiving at least two said messages as a received signal; and
      (ii) extracting, from said received signal, at least one of said messages for which said one node is a destination node, said extracting being effected using a spatial demultiplexing algorithm; and
   (d) prior to said transmitting, deciding, for each said node that is a source node, how many of the antennas thereof said each source node is allowed to use for transmitting each said message that said each source node seeks to transmit, said deciding being effected by steps including:
- (i) each said source node broadcasting, for each said message that said each source node desires to transmit, a request for a desired number of antennas for transmitting said each message;
- (ii) each said node, that receives at least one said request, broadcasting, for each said at least one request, a corresponding number of antennas allowed for transmission by said each source node; and
- (iii) each said source node adjusting said at least one desired number of antennas thereof in accordance with said at least one allowed number of antennas that is received by said each source node.

2. The method of claim 1, wherein said spatial demultiplexing algorithm is a VBLAST algorithm.

3. The method of claim 1, wherein each said source node broadcasts, for each said message that said each source node desires to transmit, a training set.

4. The method of claim 1, further comprising the step of:
- (e) resolving collisions among the nodes.

5. The method of claim 1, further comprising the step of:
- (d) for each said message, selecting a corresponding transmission power.

6. The method of claim 5, wherein said selecting of said transmission powers is effected in a manner that equalizes minimum signal-to-interference ratios of all said destination nodes.

7. The method of claim 1, wherein said requests for said desired numbers of antennas are broadcast in respective RTSs and wherein said allowed numbers of antennas are broadcast in respective CTSs.

8. A method of communication among at least three nodes, each node including a plurality of antennas, the method comprising the steps of:
- (a) each of at least two transmitting nodes simultaneously transmitting a respective message to a common destination node, using at least one antenna of said each transmitting node; and
- (b) said common destination node:
  - (i) receiving said messages as a received signal using at least as many of the antennas of said common destination node as a total number of antennas that are used by said at least two transmitting nodes to transmit said messages, and
  - (ii) extracting at least one of said messages from said received signal using a spatial demultiplexing algorithm; and
- (c) prior to said transmitting, deciding, for each said node that is a source node, how many of the antennas thereof said each source node is allowed to use for transmitting each said message that said each source node seeks to transmit, said deciding being effected by steps including:
  - (i) each said source node broadcasting, for each said message that said each source node desires to transmit, a request for a desired number of antennas for transmitting said each message;
  - (ii) each said node, that receives at least one said request, broadcasting, for each said at least one request, a corresponding number of antennas allowed for transmission by said each source node;
  - (iii) each said source node adjusting said at least one desired number of antennas thereof in accordance with said at least one allowed number of antennas that is received by said each source node.

9. The method of claim 8, wherein said requests for said desired numbers of antennas are broadcast in respective RTSs and wherein said allowed numbers of antennas are broadcast in respective CTSs.

10. A method of communication among at least three nodes, each node including a plurality of antennas, the method comprising the steps of:
- (a) each of at least one transmitting node transmitting a first respective message to a destination node of said first respective message, using at least one antenna of said each transmitting node, said destination node of said first respective message being different from said each transmitting node;
- (b) one of said at least one transmitting node transmitting a second message to a destination node of said second message, using at least one other antenna of said one transmitting node, said destination node of said second message being different from said destination node of said first message, said destination node of said second message being different from said one transmitting node;

wherein all said transmitting is effected simultaneously;
- (c) at one of said nodes:
  - (i) receiving at least two said messages as a received signal; and
  - (ii) extracting, from said received signal, at least one of said messages for which said one node is a destination node, said extracting being effected using a spatial demultiplexing algorithm; and
- (d) for each said message, selecting, from among a plurality of routes from a source node of said each message to a destination node of said each message, at least one said route including a node other than said source node of said each message and said destination node, a respective route from said source node of said each message to said destination node of said each message;

wherein, for each said message said respective route is selected to minimize a metric related to interference of nodes other than said transmitting node that transmits said each message and said destination node of said each message; and wherein said metric includes a sum of a cost of hard blockages along said respective route and a cost of soft blockages along said respective route.

11. A method of communication among at least three nodes, each node including a plurality of antennas, the method comprising the steps of:
- (a) each of at least two transmitting nodes simultaneously transmitting a respective message to a common destination node, using at least one antenna of said each transmitting node, said common destination node being different from any of said at least two transmitting nodes; and
- (b) said common destination node:
  - (i) receiving said messages as a received signal using at least as many of the antennas of said common destination node as a total number of antennas that are used by said at least two transmitting nodes to transmit said messages, and
  - (ii) extracting at least one of said messages from said received signal using a spatial demultiplexing algorithm; and
- (c) for each said message, selecting, from among a plurality of routes from a source node of said each message to said common destination node, at least one said route including a node other than said source node of said each message and said common destination node, a respective route from said source node of said each message to said common destination node;

wherein, for each said message said respective route is selected to minimize a metric related to interference of nodes other than said transmitting node that transmits said each message and said common destination node; and wherein said metric includes a sum of a cost of hard blockages along said respective route and a cost of soft blockages along said respective route.

12. A method of communication among at least three nodes of an ad hoc network, each node including a plurality of antennas, the method comprising the steps of:

(a) each of at least one transmitting node transmitting a first respective message to a destination node of said first respective message, using at least one antenna of said each transmitting node;

(b) one of said at least one transmitting node transmitting a second message to a destination node of said second message, using at least one other antenna of said one transmitting node, said destination node of said second message being different from said destination node of said first message;

wherein all said transmitting is effected simultaneously during a time slot;

(c) at one of said nodes:
(i) receiving at least two said messages as a received signal; and
(ii) extracting, from said received signal, at least one of said messages for which said one node is a destination node, said extracting being effected using a spatial demultiplexing algorithm; and (d) prior to said transmitting, deciding, for each said node that is a source node, how many of the antennas thereof said each source node is allowed to use for transmitting each said message that said each source node seeks to transmit, said deciding being effected by steps including:
(i) each said source node broadcasting, for each said message that said each source node desires to transmit, a respective request for a desired number of antennas for transmitting said each message;
(ii) each said node, that receives at least one said request, broadcasting, for each said at least one request, a corresponding allowed number of antennas;
(iii) each said source node adjusting said at least one desired number of antennas thereof in accordance with said at least one allowed number of antennas that is received by said each source node;
(iv) allocating a plurality of request mini-slots, at a start of said time slot; and
(v) allocating a plurality of response mini-slots, immediately following said plurality of request mini-slots;

such that each said source node broadcasts each said respective request thereof during one of said request mini-slots and each said node that receives at least one said request broadcasts each said corresponding allowed number of antennas during one of said response mini-slots;

wherein, for each said source node, for each said respective request that is broadcast by said each source node, said request mini-slot, during which said each source node broadcasts said each respective request, is selected randomly; and wherein, for each said node that receives at least one said request, for each said corresponding allowed number of antennas, said response mini-slot, during which said each node that receives at least one said request broadcasts said each corresponding allowed number of antennas, is selected randomly; and wherein a number of said request mini-slots and a number of said response mini-slots are selected, according to a number of said nodes that are within transmission range, so that a probability of every said request being received by all nodes within transmission range of said node that broadcasts said request is at least a predetermined value and so that a probability of every said allowed number of antennas being received by all nodes within transmission range of said node that broadcasts said allowed number of antennas is at least said predetermined value.

13. The method of claim 12, wherein said requests for said desired numbers of antennas are broadcast in respective RTSs, wherein said allowed numbers of antennas are broadcast in respective CTSs.

14. A method of communication among at least three nodes, each node including a plurality of antennas, the method comprising the steps of:

(a) each of at least one transmitting node transmitting a first respective message to a destination node of said first respective message, using at least one antenna of said each transmitting node;

(b) one of said at least one transmitting node transmitting a second message to a destination node of said second message, using at least one other antenna of said one transmitting node, said destination node of said second message being different from said destination node of said first message;

wherein all said transmitting is effected simultaneously;

(c) at one of said nodes:
(i) receiving at least two said messages as a received signal; and
(ii) extracting, from said received signal, at least one of said messages for which said one node is a destination node, said extracting being effected using a spatial demultiplexing algorithm;

(d) prior to said transmitting, deciding, for each said node that is a source node, how many of the antennas thereof said each source node is allowed to use for transmitting each said message that said each source node seeks to transmit; and (e) resolving collisions among the nodes by steps including:
(i) partitioning the nodes among a plurality of chains of decreasing desired numbers of transmitting antennas, each said chain including a final node; and
(ii) forbidding said final nodes to transmit.

15. A method of communication among at least three nodes, each node including a plurality of antennas, the method comprising the steps of:

(a) each of at least two transmitting nodes simultaneously transmitting, during a time slot, a respective message to a common destination node, using at least one antenna of said each transmitting node; and (b) said common destination node:
(i) receiving said messages as a received signal using at least as many of the antennas of said common destination node as a total number of antennas that are used by said at least two transmitting nodes to transmit said messages, and
(ii) extracting at least one of said messages from said received signal using a spatial demultiplexing algorithm; and (c) prior to said transmitting, deciding, for each said node that is a source node, how many of the antennas thereof said each source node is allowed to use for transmitting each said message that said each source node seeks to transmit, said deciding being effected by steps including:
- (i) each said source node broadcasting, for each said message that said each source node desires to transmit, a respective request for a desired number of antennas for transmitting said each message;
- (ii) each said node, that receives at least one said request, broadcasting, for each said at least one request, a corresponding allowed number of antennas;
- (iii) each said source node adjusting said at least one desired number of antennas thereof in accordance with said at least one allowed number of antennas that is received by said each source node;
- (iv) allocating a plurality of request mini-slots, at a start of said time slot; and
- (v) allocating a plurality of response mini-slots, immediately following said plurality of request mini-slots;

such that each said source node broadcasts each said respective request thereof during one of said request mini-slots and each said node that receives at least one said request broadcasts each said corresponding allowed number of antennas during one of said response mini-slots;

wherein, for each said source node, for each said respective request that is broadcast by said each source node, said request mini-slot, during which said each source node broadcasts said each respective request, is selected randomly; and wherein, for each said node that receives at least one said request, for each said corresponding allowed number of antennas, said response mini-slot, during which said each node that receives at least one said request broadcasts said each corresponding allowed number of antennas, is selected randomly; and wherein a number of said request mini-slots and a number of said response mini-slots are selected, according to a number of said nodes that are within transmission range, so that a probability of every said request being received by all nodes within transmission range of said node that broadcasts said request is at least a predetermined value and so that a probability of every said allowed number of antennas being received by all nodes within transmission range of said node that broadcasts said allowed number of antennas is at least said predetermined value.

16. The method of claim 15, wherein said requests for said desired numbers of antennas are broadcast in respective RTSs and wherein said allowed numbers of antennas are broadcast in respective CTSs.

17. A method of communication among at least three nodes, each node including a plurality of antennas, the method comprising the steps of:
- (a) each of at least two transmitting nodes simultaneously transmitting a respective message to a common destination node, using at least one antenna of said each transmitting node; and
- (b) said common destination node:
  - (i) receiving said messages as a received signal using at least as many of the antennas of said common destination node as a total number of antennas that are used by said at least two transmitting nodes to transmit said messages, and
  - (ii) extracting at least one of said messages from said received signal using a spatial demultiplexing algorithm; and
- (c) prior to said transmitting, deciding, for each said node that is a source node, how many of the antennas thereof said each source node is allowed to use for transmitting each said message that said each source node seeks to transmit; and
- (d) resolving collisions among the nodes by steps including:
  - (i) partitioning the nodes among a plurality of chains of decreasing desired numbers of transmitting antennas, each said chain including a final node; and
  - (ii) forbidding said final nodes to transmit.

\* \* \* \* \*